Jan. 20, 1970    E. B. MAXWELL ET AL    3,490,276
AUTOMOBILE ROAD TESTING DEVICE
Filed April 29, 1968
2 Sheets-Sheet 1
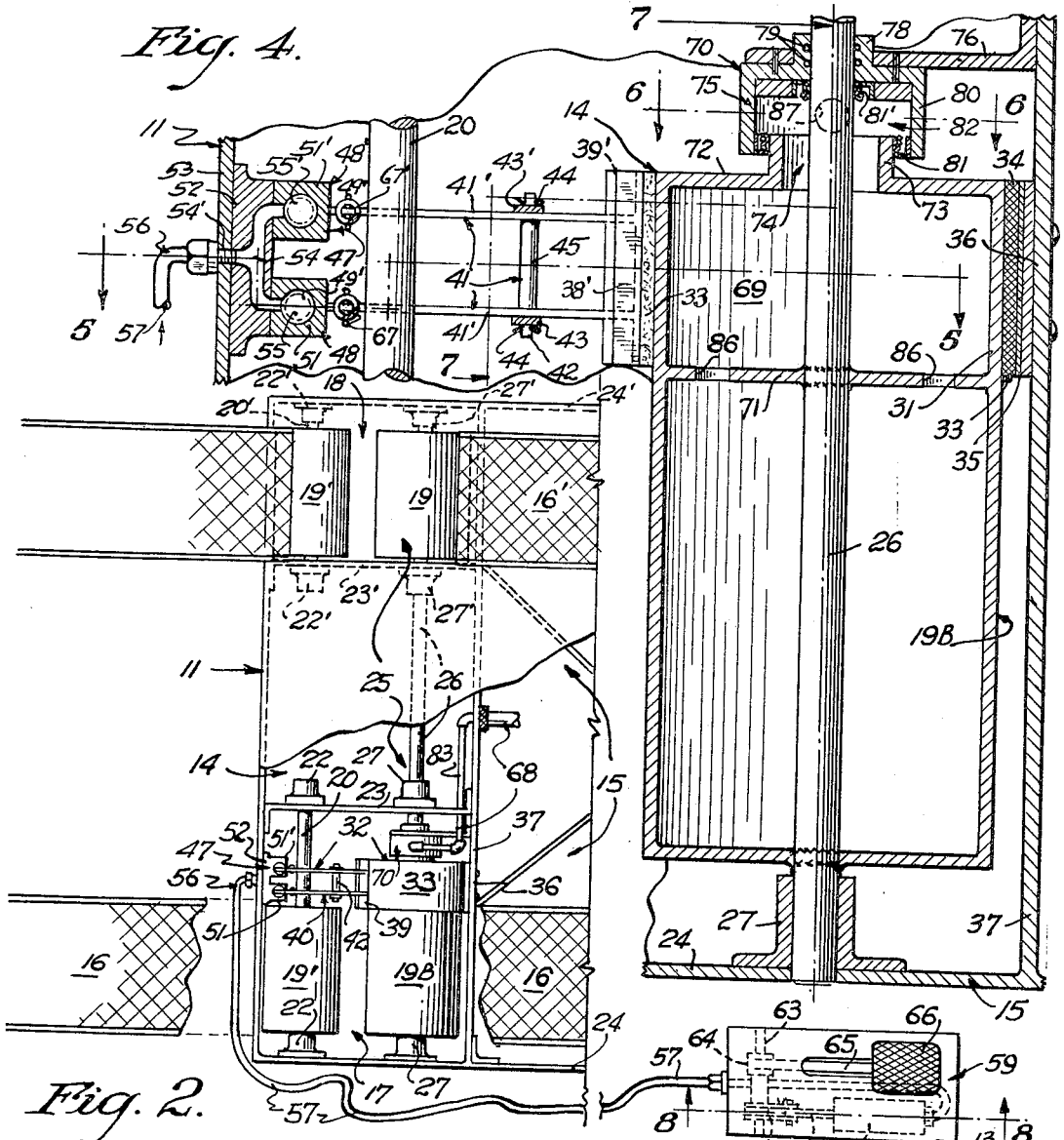
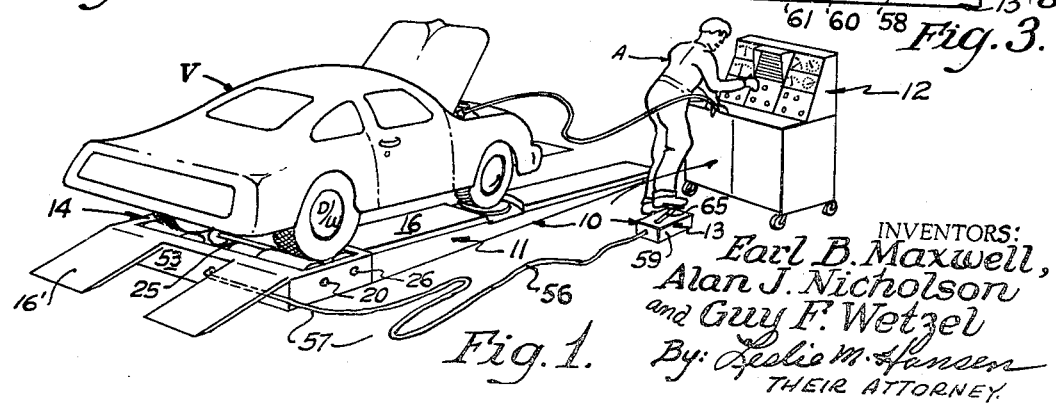
INVENTORS:
Earl B. Maxwell,
Alan J. Nicholson
and Guy F. Wetzel
By: Leslie M. Hansen
THEIR ATTORNEY Jan. 20, 1970
E. B. MAXWELL ET AL
3,490,276
AUTOMOBILE ROAD TESTING DEVICE
Filed April 29, 1968
2 Sheets-Sheet 2
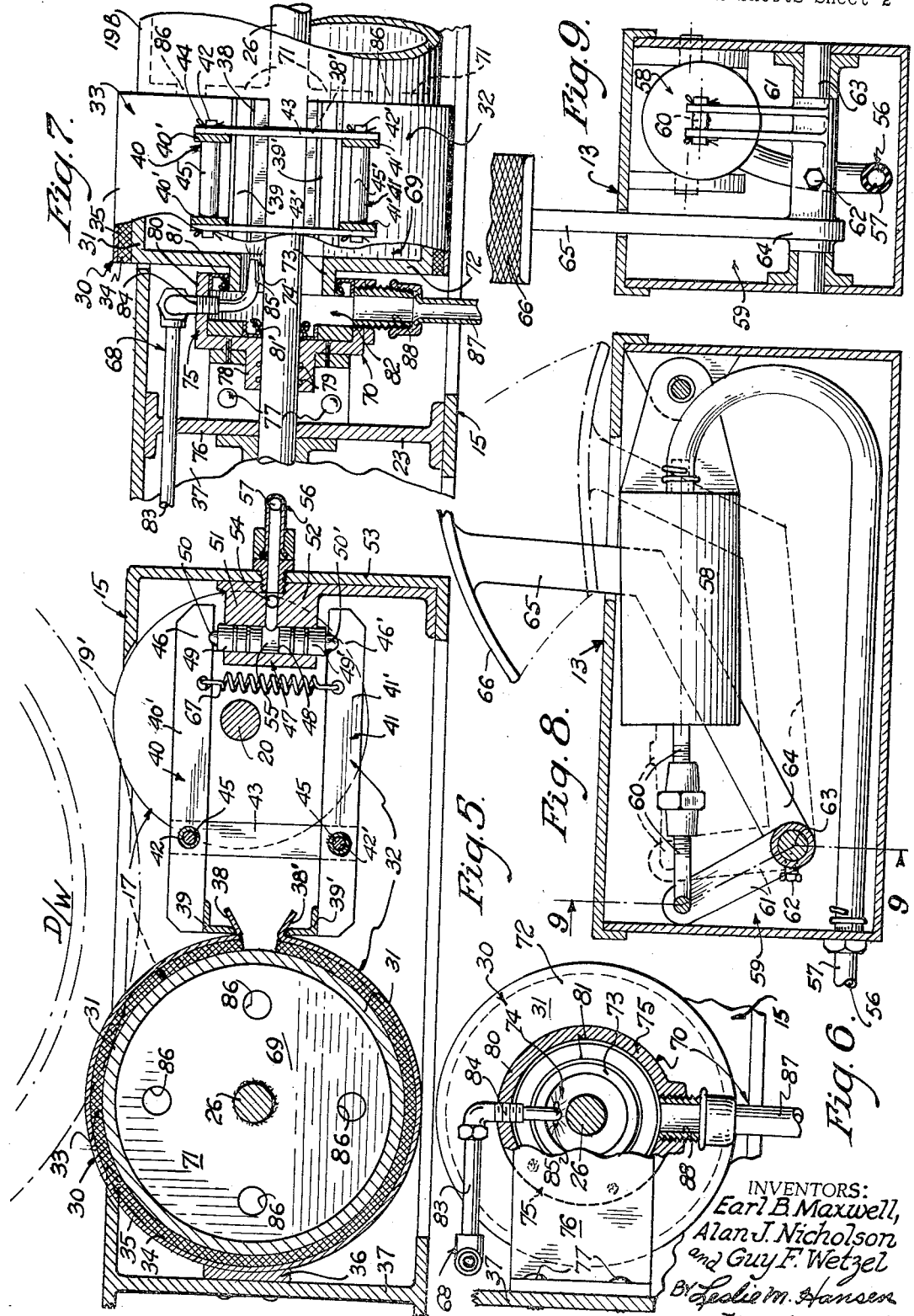
INVENTORS:
Earl B. Maxwell,
Alan J. Nicholson
and Guy F. Wetzel
By Leslie M. Hansen
THEIR ATTORNEY.

United States Patent Office 3,490,276
Patented Jan. 20, 1970

3,490,276
AUTOMOBILE ROAD TESTING DEVICE
Earl B. Maxwell, 741 Broadmore Drive, San Jose, Calif. 95129; Alan J. Nicholson, 755 Locust St., Santa Clara, Calif. 95050; and Guy F. Wetzel, 1699 Jupiter Drive, Milpitas, Calif. 95035
Filed Apr. 29, 1968, Ser. No. 725,032
Int. Cl. G01m 15/00
U.S. Cl. 73—117                                   7 Claims

ABSTRACT OF THE DISCLOSURE

A remote controlled simulated road load applicator built in to the drive wheel supporting rollers of a test stand for a vehicle under electronic diagnosis and a coolant circulating system for dissipating heat created by the resistance applied to such rollers during the test.

---

The present invention has its environment in a system of shop testing automotive vehicles in a clinic. The procedure involves a trip to such clinic where the vehicle is placed on a test stand adjacent a test panel. The test panel is portable and has various meters, electronic scopes and the like for locating troubled conditions in the engine, lighting, brakes and other operative aspects of the vehicle. Since the entire test is conducted in a shop or somewhat permanent location, the most satisfactory testing is accomplished by applying simulated road loads and conditions to the drive wheels of the vehicle under test. In this manner the readings on the various meters and scopes reflect a more accurate condition of the engine during actual performance, braking action and other aspects requiring diagnosis. The results of such test can then be documented and recommendations for necessary repairs and replacements made to the owner of the vehicle with assurance of satisfaction in performance when followed.

The present invention resides in the test stand device upon which the vehicle to be tested rests for the purpose of simulating road loads and conditions. This test stand entails a pair of rollers so journaled as to support the drive wheels of a vehicle for turning movement thereby. At last one of these rollers is a power take-off roller connected some way to a resistance applicator such that an effort to turn the latter is transmitted to the drive wheels of the vehicle. Heretofore such resistance has been applied through the medium of a dynamometer which is directly or gear connected to one of such rollers. See for example U.S. Patent No. 2,982,128 which issued May 2, 1961, to H. Gibson et al. and U.S. Patent No. 2,749,747 which issued June 2, 1956 to E. L. Cline. As is well known, dynamometers are quite expensive. Moreover, they are large in construction and therefore must necessarily be an attachment requiring space outside the supporting roller device. Other forms of such resistance applicators have involved braking means associated with the supporting rollers. Prior known braking means are shown in Templeman U.S. Patent No. 1,507,695, dated Sept. 9, 1924; Claybon U.S. Patent No. 2,803,132, dated Aug. 20, 1951, and Allen U.S. Patent No. 2,979,942, dated Apr. 18, 1961.

In each case a problem of heat dissipation is involved due to the excessive friction which necessarily follows the application of resistance to the effort exerted by the drive wheels upon the supporting rollers.

The present invention contemplates the provision of a novel compact braking means formed as an integral part of the power take-off roller combined with means for dissipating the heat created by the resistance applied.

Another object is to provide the power take-off roller of such resistance applicator with a circulating system for a coolant whereby excessive heat is constantly dissipated during braking action.

Another object of the present invention is to provide a remote control for the resistance applicator whereby the attendant making the tests on a vehicle can apply braking action while observing the meters and scopes of the test panel. In this connection it is an object to provide a portable type treadle which may be placed variously about the vehicle under test so that the attendant can apply braking action by foot leaving his hands free to manipulate controls of the vehicles or make adjustments and tests under simulated road conditions.

These and other objects and advantages of the present invention will become apparent from a reading of the following description and claims in conjunction with the accompanying two sheets of drawings in which:

FIG. 1 is a pictoral illustration of apparatus for shop testing vehicles and embodying the present invention.

FIG. 2 is a fragmentary plan view of a portion of FIG. 1 with parts broken away for purposes of illustration.

FIG. 3 is a plan view of a portable manual control embodied in the present invention.

FIG. 4 is an enlarged detailed horizontal section of the integral brake unit of FIGS. 1 and 2.

FIG. 5 is a vertical section through FIG. 4 taken along line 5—5 thereof.

FIG. 6 is a vertical section through FIG. 4 taken along line 6—6 thereof.

FIG. 7 is a section through FIG. 4 taken along line 7—7 thereof.

FIG. 8 is a vertical section through FIG. 3 taken along line 8—8 therein and at slightly larger scale.

FIG. 9 is a section through FIG. 8 taken along line 9—9 therein.

Referring to FIG. 1 an apparatus for shop testing a vehicle, generally designated 10, is shown to entail a test stand 11 for a vehicle V under test; a portable test panel 12, various meters and instruments of which may be selectively connected to particular parts of the vehicle V; and a portable remote control 13 for the test stand whereby an attendant A can apply simulated road loads to the vehicle while manipulating the same and observing the instruments on the test panel.

The test stand 11 and remote control 13 therefor concerns the embodiment of the present invention. In this embodiment the test stand 11 includes a treadmill type support 14 for the drive wheels D/W of the vehicle V operatively connected to and associated with the remote control unit 13.

The test stand 11 comprises a frame 15 having a pair of tracks 16–16′ spaced to accommodate the gauge width of the wheels of a vehicle to be tested. In the present embodiment we have shown the test stand 11 to be mounted in the frame 15 which may be placed variously within a shop, it being understood, however, that a permanet installation may be made if desired and/or required.

The treadmill support 14 which is at the after end of the frame 15 is shown in plan view at slightly larger scale in FIG. 2. The treadmill support 14 comprises two pairs of rollers 17 and 18, one pair for each of the powered wheels D/W of a vehicle to be tested. Each pair of rollers 17 and 18 is arranged in line of the track 16 and 16′, respectively, on each side of the test stand 11. Each of the pairs of rollers 17 and 18 consist of a larger front roller 19 and a smaller aft roller 19′. The aft rollers 19′ are free rolling and mounted on independent shafts 20 and 20′ which have their ends journaled in suitable bearings 22–22′ mounted on cross flange members 23–23′ and side walls 24–24′ of the frame 15.

The foremost or front rollers 19 are part of power takeoff unit 25 which includes a shaft 26 likewise journaled in bearings 27–27' supported on the cross flange members 23–23' as well as the side walls 24–24' of the frame 15. As shown in FIG. 2 the shaft 26 is continuous and common to both front rollers so that each or either of the front rollers take off power from the drive wheel D/W engaging the same. However, if desired each front roller may have a separate shaft coupled to that of the other so that both front rollers turn in unison with each other in accordance with the power transmitted thereto from the drive wheels D/W.

Within the frame 15 and as an integral part of the power take-off unit 25 is a resistance applicator 30 operatively connected to and associated with the previously mentioned remote control 13. In accordance with the present invention this resistance applicator is preferably formed as an integral part of the power take-off unit 25 for retarding turning movement of the common shaft 26 thereof.

Referring to FIGS. 4 through 7, the resistance applicator 30 comprises a drum 31 secured to the shaft 26 for rotation therewith and a brake means 32 operatively connected to the remote control 13.

The brake means 32 comprises a brake band 33 of suitable friction material 34 mounted on a metal band 35 having its mid-portion secured as at 36 to a cross beam 37 of the frame 15. The cross beam 37 is forwardly of the front rollers 19–19 such that the brake band 33 partially circumscribing the drum 31 has its ends 38–38' rearwardly extending. The ends 38–38' of the metal band 35 are bent back at an acute angle such as to form V-grooved ends spaced from and opening away from each other as seen in FIG. 5.

These V grooved ends 38–38' of the metal portion 35 of the brake band 33 are embraced between a pair of jaw-like ends 39–39' of a pair of upper and lower brake actuating scissors arms 40 and 41. Each upper arm 40 consists of a pair of levers 40' united by a cross pin 42 and each lower arm 41 consists of a comparable pair of levers 41' united by a cross pin 42'. The upper and lower cross pins 42 and 42' are linked together by outside struts 43–43' pivotally connected to the cross pins and secured thereon by suitable means such as cotter pins 44.

The jaw-like ends 39–39' comprise upper and lower angle irons having their horizontally disposed flanges secured to the fore ends of the upper and lower pairs of levers 40' and 41', respectively. The vertical flanges of the upper and lower angle irons thus form the jaws 39–39' which span the width of the brake band 33. The upper and lower sets of levers 40–41, 40' and 41' are thus spaced from each other so that the lever arm on each side bears midway of and against one-half the length of each jaw-like end as illustrated in FIG. 7. Each cross pin 42 and 42' also has an enlarged center portion or sleeve 45–45', respectively, thereon for maintaining the lever arms 40' and 41' of each upper and lower set thereof in parallel spaced relation rearwardly of the jaw-like ends 39–39'. The aft end 46 of each set of scissors arms 40 and 41 is disposed between axially movable actuating means 47 by which to operate the two sets of scissors arms in unison. The movable actuating means 47 for each set of scissors arms 40–41 consist of an hydraulic cylinder 48 having a pair of pistons 49–49' arranged coaxially therein with their outer ends 50–50' disposed to engage the aft end 46 of each upper and lower lever 40'–41' of each set of such scissors arms 40 and 41.

Each cylinder 48 is formed in a housing 51–51' secured to a common mounting plate 52 in turn secured to the aft wall 53 of the frame 15. The mounting plate 52 has a transverse passage 54 which communicates with the cylinder 48 in each housing 51 and 51' midway the upper and lower ends thereof, i.e., between the upper and lower pistons 49 and 49' therein.

The upper and lower pistons 49–49' in each housing 51 and 51' are normally separated by hydraulic fluid 55 in a pressurized system 56 which includes the remote control unit 13. This system 56 includes a common pressure line or conduit 57 having one end communicating with the transverse passage 54 via a nipple 54' extending from the mounting plate 52 through the back wall 53 of the frame 15.

The pressure line or conduit 57 is a flexible hose long enough to extend around the vehicle V under test and having its opposite end communicating with a master cylinder 58 in the remote control unit 13 (FIGS. 3, 8 and 9). The master cylinder 58 is arranged within a metal box 59 with one end of the cylinder mounted therein for relative fixation thereto. The master cylinder has a piston on a rod 60 extending into engagement with one end of a lever arm 61 having its opposite end secured as at 62 to a rocker shaft 63 journaled within the box 59. Also mounted on the rocker shaft 63 is one end 64 of a brake pedal 65, the treadle portion 66 of which is outside the box 59 for operation by foot or hand pressure of the attendant or person making the test.

The hydraulic system 56 is a closed system in which the fluid 55 reacts between the piston of the master cylinder 58 and the two sets of pistons 49–49' of the actuating means 47 of the brake actuating scissors arms 40 and 41. In this connection it will be noted that the jaws 39–39' of each set of scissors arms 40–41 is forced into open or non-braking position by a tension spring 67–67', respectively. In this manner the aft ends 46 of each set of upper and lower arm 40'–41' is drawn toward each other to press the respective upper and lower pistons 49 and 49' engaged thereby toward each other against the action of the pressurized fluid 55 in the system 56.

Thus it will be noted that the jaw-like ends 39–39' are separated to release the brake band 33. By the same token the back pressure in the system 56 under the influence of the tension springs 67–67' forces the fluid 55 back into the master cylinder 58 thereby rocking the rocker shaft 63 in a direction to raise the treadle 66 of the brake pedal 65 relative to the metal box 59 of the remote control unit 13.

By the foregoing arrangement braking action can be applied to the power take-off 25 while the drive wheels D/W of the vehicle are turning during normal operation of the engine. The remote control unit 13 can be placed anywhere convenient to the attendant's operation of the vehicle. The metal box 59 can be placed in the cab of the vehicle V; around the engine compartment or near the test panel 12 whereby the attendant can apply the necessary resistance to the effort of the drive wheels and thereby simulate any road load under any condition encountered during normal operation of the vehicle under test.

The braking action thus applied to the drum 31 of the resistance application 30 will, of course create a considerable amount of heat due to the friction between the drum 31 and brake band 33. In accordance with the present invention a built-in cooling system 68 is provided in conjunction with the resistance applicator 30.

Referring now to FIGS. 2 and 4 through 7, the built in cooling system 68 comprises a chamber 69 within the drum 31 and a coolant circulating system 70 for circulating a heat dissipating fluid through the chamber 69 during rotation of the drum 31 by operation of the drive wheels D/W of the vehicle. To this end the drum 31 is preferably formed as a part of one of the front rollers 19B of the power take-off unit 25.

As best seen in FIGS. 4 and 7 the drum 31 is a continuation of and an integral part of said one front roller 19B. The drum portion 31 of roller 19B extends inwardly of the frame 15 in a space provided between such roller 19B and the adjacent cross flange member 23 of the frame 15. The normal end wall 71 of the roller 19B which is secured to the shaft 26 forms one end wall of the drum 31 and drivingly connects the same to the common shaft 26 of the power take-off unit 25.

The opposite end wall 72 of the drum 31 is not connected to the shaft 26 but has a laterally projecting annular flange 73 which is larger in diameter than the shaft 26 to circumscribe the same and provide an inlet passage 74 for the coolant circulating system 70. A fixed cap 75 serves as a cover for the open end of the annular flange 73 and provides an inlet and outlet for the circulating system 70. The cap 75 is secured to a bracket 76 mounted as at 77 on the cross beam 37 of the frame 15. The cap 75 has a hub 78 mounted on the shaft 26 and provided with sealing rings 79. The cap 75 has an annular wall 80 projecting back over the annular flange 73 of the drum 31. This annular wall 80 is of greater diameter than the flange 73 and has suitable fluid seals 81 and 81' which bear against the flange 73 and shaft 26 to keep the circulating coolant from leaking out. This provides a stationary chamber 82 within the cap 75 in communication with the passage 74.

A water line 83 coming from a suitable source of supply enters the chamber 83 from above via a nipple 84 extending through the annular wall 80 and having a nozzle end 85 which diverts the incoming water as a jet into the passage 74 and chamber 69 within the drum 31. The water entering the drum 31 swirls around in the chamber 69 to absorb and dissipate the heat created during braking action. The party wall 71 between the drum 31 and roller 19B is perforated as at 86 so that cooling fluid enters the interior of drum 19B to cool the same also.

The cooling fluid within the chamber 69 of the drum 31 as well as within the roller 19B ultimately discharges via the passage 74 and a drain line 87 via a bib 88 secured to the annular wall 80 of the cap 75. The bib 88 is disposed lowermost, diametrically opposite the inlet nipple 84 in the region of the chamber 83 of the cap. The drain line 87 may discharge directly into a soil pipe on the premises or through a cooling system for recirculation in a cold condition back through the supply line 83.

By this arrangement the coolant fluid is circulated through the brake drum 31 to assure heat dissipation and cooling of the drum, brake band 33 and roller 19B. The remote controlled brake means is thus compact and an integral part of the power take-off unit 25 with assurance of continuous performance under driving conditions of the vehicle under test.

Having thus described in specific detail our improved construction and cooling system for a remote controlled brake system in a resistance applicator for simulating road tests to a vehicle it will be appreciated by those skilled in the art that the same may be susceptible to modification, alteration and/or variations without departing from the spirit or scope of our invention therein. We, therefore, desire to avail ourselves of all modifications, alterations and/or variations as may fairly come within the purview of the appended claims.

What we desire to protect by Letters Patent is:

1. In a test stand of the type having a frame within which power take-off rollers are journaled on a common shaft in cooperation with idler rollers for supporting the drive wheels of a vehicle under test; a remote controlled resistance applicator for such power take-off rollers comprising in combination:
 a brake drum formed integrally with one of said power take-off rollers and having an internal chamber communicating therewith for receiving coolant fluid;
 a brake band mounted within said frame and partially circumscribing said brake drum;
 lever means mounted within said frame operatively connected to said brake band and adapted to be frictionally forced against said brake drum for restraining turning movement thereof;
 a remote controlled brake applying system operatively connected to said lever means for actuating said lever means;
 said brake drum having one end wall of said chamber therein provided with a lateral flange of greater diameter than said common shaft and coaxially of and circumscribing the latter;
 a cover cap fixedly mounted on said frame concentric to said common shaft in spaced relation to the open end of the lateral flange on said one end wall of said chamber;
 sealing means between said cap and the lateral flange and the common shaft to thereby provide a fixed chamber adjacent the open end of said flange;
 a source of supply of coolant fluid communicating with said fixed chamber thorugh said cover cap for admitting such coolant into the chamber within said brake drum during rotation thereof; and
 a drain line communicating with said fixed chamber for discharging coolant fluid therefrom as it circulated through said brake drum.

2. The resistance applicator in accordance with claim 1 including an inlet jet in the fixed chamber of said cover cap communicating with said source of supply of coolant fluid for discharging the same into said brake drum via the open end of the lateral flange on said one end wall of said drum.

3. The resistance applicator of claim 2 in which said remote controlled brake applying system includes a portable unit adopted to be placed variously in and about the vehicle to be tested, a brake pedal and a master cylinder operated thereby mounted in said portable unit,
 a brake lever actuating cylinder mounted in the frame of said test stand and having a piston therein engaging said lever means; and
 a flexible hose communicating the master cylinder in said portable unit with said brake lever actuating cylinder for effecting operation of said lever means to force said brake band frictionally against said brake drum.

4. The resistance applicator as in claim 2 in which said brake band partially circumscribing said brake drum has a pair of V-shaped ends opening away from each other and in which said lever means comprises:
 a pair of scissors arms having jaw-like ends engaging the V-shaped ends of such brake band,
 a linkage pivotally connected to each pair of said scissors arms to facilitate movement of their jaw like ends toward and from the V-shaped ends of said brake band,
 an hydraulic piston engageable with the opposite ends of each of said scissors arms mounted in an hydraulic cylinder secured to said frame and operatively associated with said remote controlled brake applying system for effecting braking action of said brake band against said brake drum.

5. The resistance applicator of claim 4 in which said remote controlled brake applying system includes a portable unit adapted to be placed variously in and about the vehicle to be tested,
 said portable unit having a brake pedal mounted thereon for rocking movement and a master cylinder mounted therein and operatively connected to said brake pedal; and
 a flexible hose communicating said master cylinder with said hydraulic cylinders for effecting operation of said scissors arms corresponding to the rocking movement of said brake pedal.

6. In a test stand of the type having a frame withing which power take-off rollers are journaled on a common shaft in cooperation with idler rollers for supporting the drive wheels of a vehicle under test; a remote controlled resistance applicator for such power take-off rollers comprising in combination:
 a brake drum formed integrally with one of said power take-off rollers and having an internal chamber communicating therewith for receiving coolant fluid;

a brake band mounted on said frame for partially circumscribing said brake drum and having a pair of V-shaped ends opening away from each other;

a pair of scissors arms having jaw-like ends engaging the V-shaped ends of said brake band;

a linkage pivotally connected to each pair of said scissors arms to facilitate movement of their jaw-like ends toward and from the V-shaped ends of said brake band;

an hydraulic piston engageable with the opposite ends of each of said scissors arms mounted in an hydraulic cylinder secured to said frame; and a remote controlled brake applying system operatively associated with said hydraulic piston for effecting braking action of said brake band against said brake drum.

7. The resistance applicator of claim 6 in which said remote controlled brake applying system includes a portable unit adapted to be placed variously in and about the vehicle to be tested, said portable unit having a brake pedal mounted thereon for rocking movement and a master cylinder mounted therein and operatively connected to said brake pedal; and a flexible hose communicating said master cylinder with said hydraulic cylinders for effecting operation of said scissors arms corresponding to the rocking movement of said brake pedal.

References Cited

UNITED STATES PATENTS

| | | | |
|---|---|---|---|
| 976,705 | 11/1910 | Spellman | 73—135 X |
| 2,012,110 | 8/1935 | Shroyer | 73—117 |
| 3,068,689 | 12/1962 | Warshaw | 73—135 |
| 3,402,599 | 9/1968 | MacMillan | 73—117 |

FOREIGN PATENTS 47,492   3/1932   Denmark.

JERRY W. MYRACLE, Primary Examiner